June 30, 1931.  W. F. LUSK ET AL  1,812,597
BAIL AND METHOD OF APPLYING SAME
Filed March 29, 1929
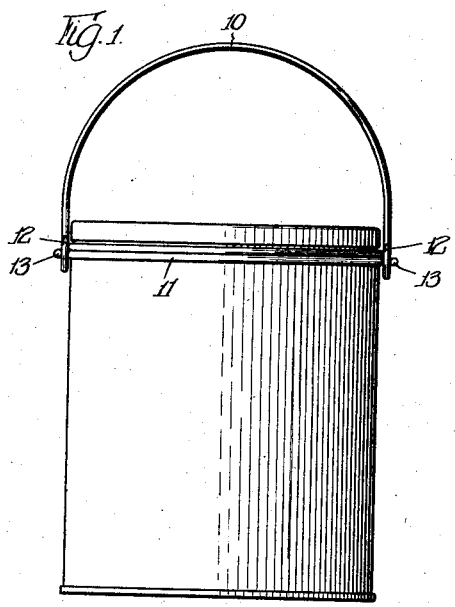
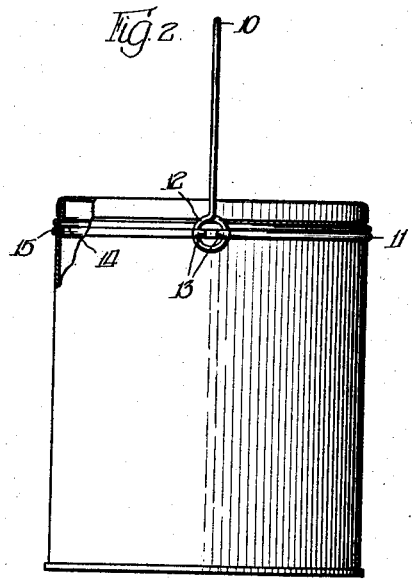
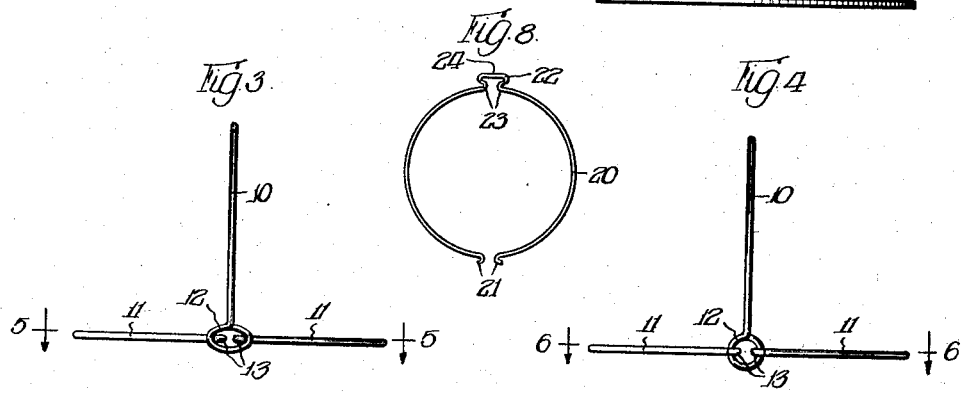
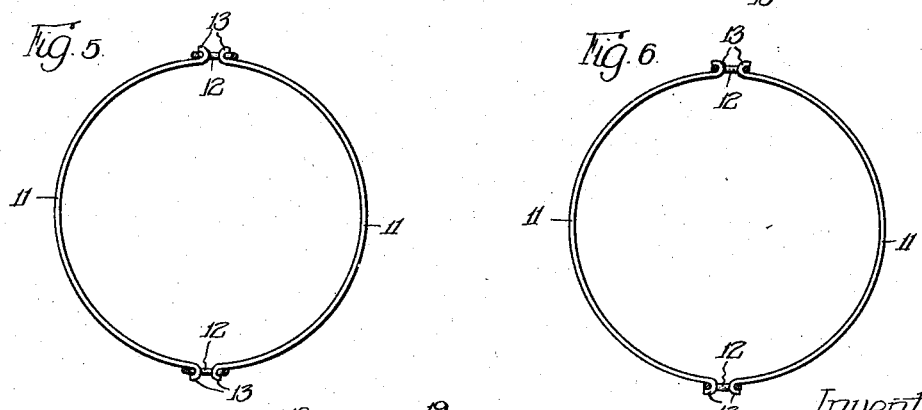
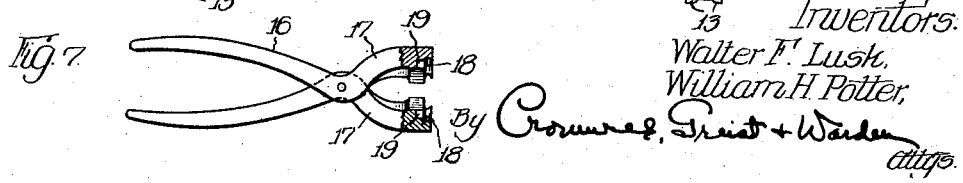
Inventors:
Walter F. Lusk,
William H. Potter, Patented June 30, 1931

1,812,597

UNITED STATES PATENT OFFICE

WALTER F. LUSK AND WILLIAM H. POTTER, OF CHICAGO, ILLINOIS, ASSIGNORS TO ARMOUR & COMPANY, OF CHICAGO, ILLINOIS, A CORPORATION OF ILLINOIS

BAIL AND METHOD OF APPLYING SAME

Application filed March 29, 1929. Serial No. 350,972.

This invention has to do with the bails used on lard pails and similar containers, and is concerned particularly with certain hereinafter described improvements in the form of attachment employed.

Heretofore it has been the common practice, in attaching a bail to a lard pail or similar container, to cut openings in opposite sides of the pail, position cup-shaped caps in the apertures with the bottoms of the caps toward the outside, place flanged disks over the edges of the caps on the inside, press the disks and the caps together to produce tight connections between the same and the edges of the openings in the pail, and hook the ends of a curved bail into small apertures formed in the protruding bottoms of the caps. A pail to which a bail has been attached by the employment of ears, either in the manner above described, or in some other manner, is objectionable in several respects. It is practically impossible to produce fluid-tight connections between the edges of the ears and the edges of the openings in the pail, with the result that in one or more of a stock of filled pails some leakage of the lard or other material is almost certain to occur. Furthermore, the ears in which the ends of the bail are hooked protrude beyond the contour of the pail and present both central cavities and marginal offsets which are difficult to clean and in which bacteria can develop undisturbed. Moreover, the attachment of the bail with respect to the ears is at best insecure, as the bail is liable to pull out or drop off. Besides, the entire weight of the pail and its contents is supported by the bail at the locations of the ears only, with the result that the pail will be pulled out of shape when heavy loads are carried in the same.

The object of the present invention is to provide a novel and distinctly improved form of bail attachment which does not require the employment of ears.

The bail attachment constituting the invention possesses many excellent features, and is not open to any of the above mentioned objections. It is not necessary to perforate or in any way deform the sides of the pail in order to attach the bail. The bail is extremely easy to attach, and may be attached either before or after the pail is filled, or may be shipped separate from the filled pail and attached by the retailer at the time of sale, thereby permitting more compactness in shipping and displaying. The bail-attaching members increase the resistance of the pail to deformation, distribute the load, and tend to tighten their grip upon the pail under increased loads.

The foregoing are but a few of the more salient advantages to be had by the employment of the improved bail attachment. Other objects and advantages will be apparent upon a full understanding of the novel construction of the improved bail and the novel method of attaching the same.

Two slightly different embodiments of the invention are presented herein for the purpose of exemplification, but it will of course be appreciated that the invention is susceptible of embodiment in other structurally modified forms coming equally within the scope of the appended claims.

In the accompanying drawings:

Fig. 1 is a side view of a pail equipped with the bail of the invention;

Fig. 2 is another side view of the same pail;

Fig. 3 is a side view of the bail and its associated attaching members, after being assembled together but before being locked in assembled relation;

Fig. 4 is a corresponding view of the bail and its associated attaching members, after being locked in assembled relation;

Fig. 5 is a horizontal section, taken on the line 5—5 of Fig. 3;

Fig. 6 is a horizontal section, taken on the line 6—6 of Fig. 4;

Fig. 7 is a partially sectioned side view of a pair of special bail-attaching pliers; and Fig. 8 is a plan view of a single attaching member which is designed for use as a modification in lieu of the two complementary attaching members illustrated in the other views.

In the embodiment of the invention shown in Figs. 1 to 6 inclusive, the bail assembly consists of a substantially semi-circular bail 10 and two substantially semi-circular attaching members 11. The bail is made of metal wire or other suitable material, and is provided at its end with laterally elongated loops 12, while the two attaching members, like the bail, are made of metal wire or other suitable material, and are provided at their ends with outwardly turned hooks 13.

The bail is adapted to be applied to any pail which has a downwardly and outwardly facing annular shoulder adjacent the rim thereof. Such a shoulder may be presented by the lower portion of an annular rib, or by the upper portion of an annular groove, or by the intermediate portion of a combination rib and groove such as the ogee formation 14 provided in the pail shown in the drawings.

In order to apply the bail to the pail shown in the drawings, the two attaching members 11 are positioned in the groove 15 in complementary relation to each other, and the loops 12 on the ends of the bail are placed over the hooks 14 in the manner shown in Figs. 3 and 5. After the parts have been assembled in the relation described, the loops 12 are forced to assume the circular shape shown in Figs. 4 and 6, thereby causing the loops to be interlocked with the hooks.

The deformation of the loops 12 may be effected either by machine or by hand. If the work is done by hand, any suitable tool, such as the specially designed pair of pliers 16 shown in Fig. 7, may be used to advantage. The jaws 17 of the pliers 16 are provided with substantially semi-circular grooves 18 in the ends thereof which together assume the shape of a circle when brought together and are also provided with recesses 19 behind the central portions of the grooves 18 for the accommodation of the ends of the hooks on the members 11. In the absence of a specially designed pair of pliers, the deforming operation may be performed with an ordinary pair of pliers.

After the bail has been attached to a pail in the manner above described, the attaching members will be held snugly about the pail by the engagement of the hooks 13 with the loops 12, while the bail will be free to turn down into a position against either side of the pail. When the pail is lifted by the bail, the lower portions of the loops will tend to draw the opposed hooks together under the weight of the contents, with the result that, the greater the load, the more secure the attachment. The attaching members, by reason of their detached but encompassing relation to the pail, greatly reinforce the pail and prevent the upper portion of the same from being pulled out of shape under heavy loads. The slight amount of friction between the bail and the attaching members serves to hold the bail in any position in which placed.

Instead of using two separate semi-circular attaching members 11, as shown in Figs. 1 to 6 inclusive, a single circular attaching member 20 may be employed, as shown in Fig. 8. The member 20 is provided at its free ends with hooks 21 similar to the hooks 13, and is provided at a point diametrically opposite the hooks 21 with an offset formation 22 consisting of two hooks 23 which are joined together at 24. One of the elongated loops on the bail is adapted to be forced into circular shape in interlocked association with the hooks 21, while the other elongated loop on the bail is adapted to be forced into circular shape in interlocked association with the hooks 23.

We claim:

1. As a new article of manufacture, a bail having elongated loops adjacent the ends thereof, which loops are adapted to be forced into circular shape, and pail-embracing means having portions which are adapted to interlock with the loops, when the latter are made circular to permit the bail to be swung into any position without disturbing the interlock.

2. As a new article of manufacture, a bail having loops adjacent the ends thereof, and pail-embracing means having outwardly opening hooks which are open sufficiently to receive the loops and are adapted to interlock with the latter.

3. As a new article of manufacture, a bail having elongated loops adjacent the ends thereof, and pail-embracing means having outwardly opening hooks which are adapted to interlock with the loops upon deformation of the latter.

4. As a new article of manufacture, a bail having oval-shaped loops adjacent the ends thereof, and pail-embracing means having outwardly opening hooks which are adapted to interlock with the loops upon the latter being rendered circular in shape.

5. As a new article of manufacture, a bail having loops adjacent the ends thereof, and pail-embracing means having two pairs of oppositely facing outwardly opening hooks over which the loops are adapted to pass and fit in interlocked relation.

6. As a new article of manufacture, a bail having loops adjacent the ends thereof, and two complementary pail-embracing members having outwardly opening hooks adjacent the adjoining ends thereof over which the loops are adapted to pass and fit in interlocked relation.

7. A method of applying a bail to a pail, which consists in forming elongated loops in the ends of a bail, passing such loops over pairs of oppositely facing hooks provided at the sides of the pail, and causing the loops to assume substantially circular shapes in interlocked association with the hooks.

8. A method of applying a bail to a pail, which consists of forming elongated loops in the ends of a curved bail, forming outwardly facing hooks in the ends of two curved attaching members, placing the attaching members about a pail in complementary relation to each other, positioning the loops on the bail over the hooks on the attaching members with the hooks in the ends of the loops, and rendering the loops substantially circular in shape whereby to interlock with the hooks.

In witness whereof we have hereunto subscribed our names.

WALTER F. LUSK.
WILLIAM H. POTTER.